United States Patent
Filgueiras et al.

(10) Patent No.: US 8,982,794 B2
(45) Date of Patent: Mar. 17, 2015

(54) DETERMINATION OF PACKET RETRANSMISSION USING TIME THRESHOLD

(71) Applicant: Microsoft Corporation, Redmond, WA (US)

(72) Inventors: Henry M. A. Filgueiras, Kirkland, WA (US); Mitesh K. Desai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 13/671,529

(22) Filed: Nov. 7, 2012

(65) Prior Publication Data

US 2014/0126468 A1 May 8, 2014

(51) Int. Cl.
*H04L 1/18* (2006.01)
*H04L 12/26* (2006.01)
(Continued)

(52) U.S. Cl.
CPC .......... *H04L 1/1812* (2013.01); *H04L 12/2602* (2013.01); *H04L 1/1822* (2013.01); *H04W 36/02* (2013.01); *H04W 28/14* (2013.01);
(Continued)

(58) Field of Classification Search
CPC ..... H04L 1/1812; H04L 12/2602; H04L 1/16; H04L 1/1845; H04L 1/1848; H04L 1/1887; H04L 43/00; H04L 1/1822; H04L 1/1838; H04L 1/1877; H04L 1/1893; H04W 28/04; H04W 28/14; H04W 36/02; H04W 36/18
USPC ............................ 370/254–350; 709/201–213
See application file for complete search history.

(56) References Cited

U.S. PATENT DOCUMENTS 7,911,954 B2 *  3/2011  Cheng et al. ................. 370/235
8,208,451 B2    6/2012  Seok
(Continued)

FOREIGN PATENT DOCUMENTS

WO    2011018751 A1    2/2011

OTHER PUBLICATIONS

Venkatesan, et al., "Normative Text for D3.02 Timing Measurement", Retrieved at <<https://www.google.com/url?sa=t&rct=j&q=&esrc=s&source=web&cd=1&ved=0CDUQFjAA&url=https%3A%2F%2Fmentor.ieee.org%2F802.11%2Fdcn%2F08%2F11-08-1229-00-000v-normative-text-for-d3-02-timing-measurement.doc&ei=lekYUOH6G83hrAf90oHgDw&usg=AFQjCNEqUSTydxyj-OXBviJ2Q0EDv-Oehg>>, Oct. 14, 2008, pp. 26.

(Continued)

*Primary Examiner* — Ayaz Sheikh
*Assistant Examiner* — Debebe Asefa
(74) *Attorney, Agent, or Firm* — Kate Drakos; Micky Minhas

(57) ABSTRACT

Techniques for determination of packet retransmission using a time threshold are described. In at least some embodiments, information for a packet that is received is compared to information for previously received packets. If the information for the packet matches a previously received packet, a receive time for the packet is compared to a timestamp for the previously received packet to determine if the packet is a retransmission of the previously received packet. In at least some embodiments, packet information associated with different senders can be stored, e.g., to enable packet information comparison for purpose of retransmission detection. An amount of packet information that is stored can be limited to a certain number of senders to control the impact of packet information storage on memory resources.

20 Claims, 6 Drawing Sheets

(51) Int. Cl.
  *H04W 28/04* (2009.01)
  *H04W 52/02* (2009.01)
  *H04B 1/00* (2006.01)
  *H04W 36/02* (2009.01)
  *H04W 28/14* (2009.01)
  *H04L 1/16* (2006.01)

(52) U.S. Cl.
  CPC ............ *H04L 1/1838* (2013.01); *H04L 1/1845* (2013.01); *H04L 1/1877* (2013.01); *H04L 1/1887* (2013.01); *H04L 1/16* (2013.01); *H04L 43/00* (2013.01); *H04L 1/1893* (2013.01); *H04L 1/1848* (2013.01); *H04W 28/04* (2013.01)
  USPC .......................................................... 370/328

(56) References Cited

U.S. PATENT DOCUMENTS

| | | | |
|---|---|---|---|
| 8,453,029 B2* | 5/2013 | Dinan | 714/748 |
| 2010/0067606 A1* | 3/2010 | Feng et al. | 375/268 |
| 2011/0069689 A1 | 3/2011 | Grandhi et al. | |
| 2011/0185200 A1 | 7/2011 | Sim et al. | |
| 2012/0084616 A1 | 4/2012 | Wentink | |
| 2012/0158839 A1 | 6/2012 | Hassan et al. | |

OTHER PUBLICATIONS

"Wi-Fi Direct Protocol Implementation", Retrieved at <<http://msdn.microsoft.com/en-us/library/windows/hardware/hh440290(v=vs.85).aspx>>, Retrieved Date : Aug. 1, 2012, pp. 3.

* cited by examiner

| Sender ID | Packet Type | Token | Timestamp |
|---|---|---|---|
| abc123 | X | 421001B1... | 13:24 |
| def456 | X | 987574S4... | 13:26 |
| abc123 | Y | 716256B4 | 13:26 |
| abc123 | X | 421001B1 | 13:27 |
| def456 | Z | 987612W7 | 13:28 |
| [...] | [...] | [...] | [...] |

Fig. 2

DETERMINATION OF PACKET RETRANSMISSION USING TIME THRESHOLD

BACKGROUND

Many devices today utilize some form of wireless data communication. While a variety of different types of wireless data communication exist, radio frequency (RF) communication is pervasive. Examples of RF communication include cellular networks (e.g., for cell phones), Wi-Fi®, broadcast television, global positioning system (GPS) navigation, and so forth.

RF data communication can be particularly useful to facilitate inter-device communication. For instance, a wireless input/output (I/O) device (e.g., a mouse, a touchpad, a keyboard, and so on) can communicate with a computer utilizing various forms of RF communication. This can enable a user to provide input to a computer independent of a wired connection between an input device and the computer.

Utilizing RF communication for data transmission typically involves transmitting data in packets. However, interruptions in packet transmission can occur. For instance, a device can experience power state interruption while sending and/or receiving a stream of data packets. Further, high signal noise environments can cause data packets to be dropped.

Many devices are configured to retransmit data packets when problems in packet transmission are detected. In some scenarios, however, packet retransmission can cause problems with a receiving device. For instance, if a transmitting device erroneously detects that a packet was not received, it can retransmit the packet. A receiving device can thus end up receiving the same packet twice and attempting to process the duplicate packets as different packets. This can impair the ability of the receiving device to properly process an associated stream of data packets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for determination of packet retransmission using a time threshold are described. In at least some embodiments, information for a data packet that is received is compared to information for previously received packets. If the information for the data packet matches a previously received data packet, a receive time for the data packet is compared to a timestamp for the previously received data packet to determine if the data packet is a retransmission. For instance, if a time difference between the receive time for the data packet and the timestamp for the previously received data packet is less than a specified threshold time difference, the packet can be determined to be a retransmitted packet. Otherwise, the data packet can be processed as a new (e.g., non-retransmitted) packet.

In at least some embodiments, packet information associated with different senders can be stored, e.g., to enable packet information comparison for purpose of retransmission detection. An amount of packet information that is stored can be limited to a particular number of senders. When the number of senders for which packet information is stored reaches a maximum, packet information for a sender can be deleted to make room for packet information for a new sender. This can enable the impact of packet information storage on memory resources to be controlled.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 is an illustration of an example tracking table that can be employed to track packet information in accordance with one or more embodiments.

DETAILED DESCRIPTION

Overview

Techniques for determination of packet retransmission using a time threshold are described. In at least some embodiments, information for a data packet that is received is compared to information for previously received packets. If the information for the data packet matches a previously received data packet, a receive time for the data packet is compared to a timestamp for the previously received data packet to determine if the data packet is a retransmission. For instance, if a time difference between the receive time for the data packet and the timestamp for the previously received data packet is less than a specified threshold time difference, the packet can be determined to be a retransmitted packet. Otherwise, the data packet can be processed as a new (e.g., non-retransmitted) packet.

In at least some embodiments, packet information associated with different senders can be stored, e.g., to enable packet information comparison for purpose of retransmission detection. An amount of packet information that is stored can be limited to a particular number of senders. When the number of senders for which packet information is stored reaches a maximum, packet information for a sender can be deleted to make room for packet information for a new sender. This can enable the impact of packet information storage on memory resources to be controlled.

In the following discussion, an example environment is first described that is operable to employ techniques described herein. Next, a section entitled "Tracking Table" describes an example tracking table that can be employed to track packet information in accordance with one or more embodiments. Following this, a section entitled "Example Method" describes an example method for determination of packet retransmission using a time threshold in accordance with one or more embodiments. Next, a section entitled "Retention of Packet Data" describes example techniques for storing packet data in accordance with one or more embodiments. Following this, a section entitled "Processing Retransmitted Packets" describes example techniques for processing retransmitted packets in accordance with one or more embodiments. Finally, a section entitled "Example System and Device" describes an example system and device that are operable to employ techniques discussed herein in accordance with one or more embodiments.

Example Environment

Figure 1:
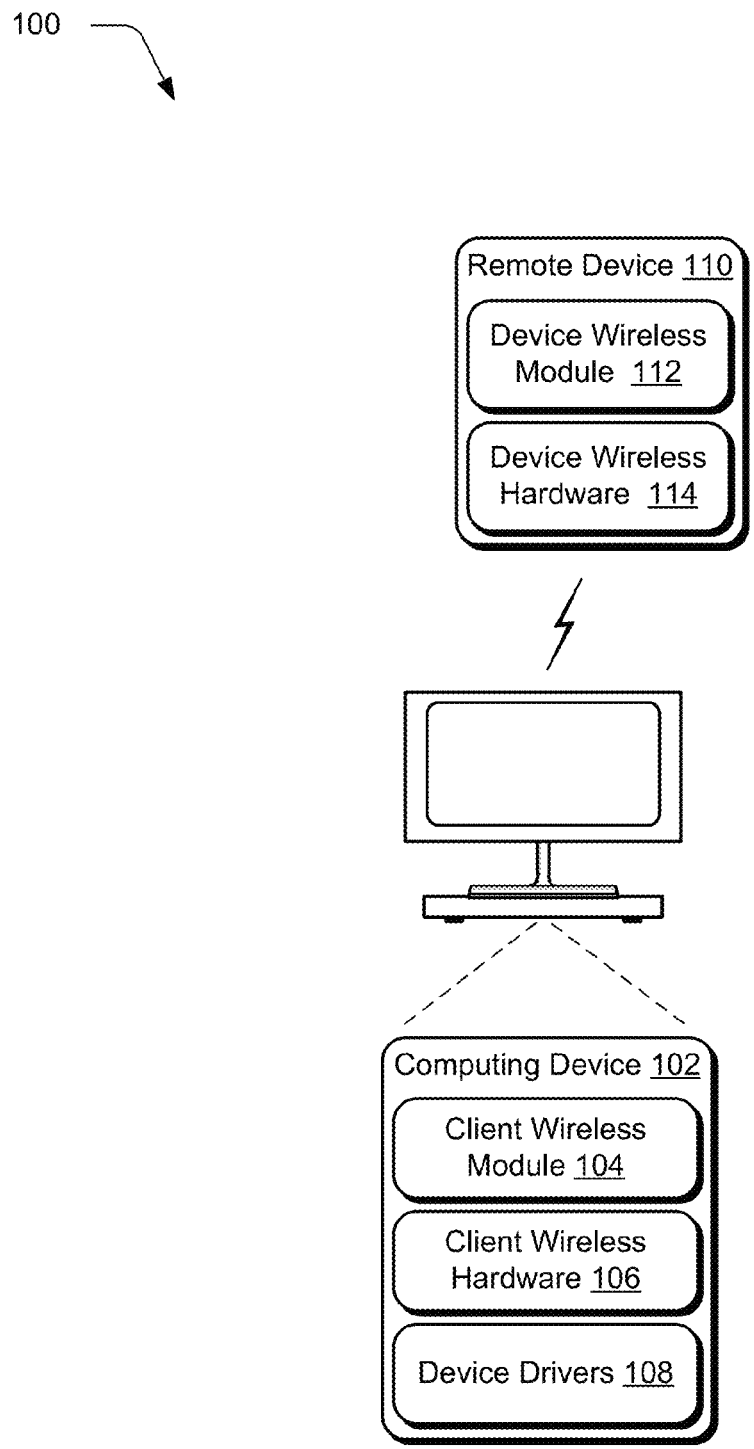
FIG. 1 is an illustration of an environment in an example implementation that is operable to employ techniques discussed herein in accordance with one or more embodiments.

FIG. 1 is an illustration of an environment 100 in an example implementation that is operable to employ techniques for determination of packet retransmission using a time threshold in accordance with one or more embodiments. Environment 100 includes a computing device 102 which can be embodied as any suitable computing device such as, by way of example and not limitation, a desktop computer, a portable computer (e.g., a laptop), a handheld computer such as a personal digital assistant (PDA), a tablet computer, and so forth. One of a variety of different examples of a computing device 102 is shown and described below in FIG. 6.

The computing device 102 of FIG. 1 is illustrated as including a client wireless module 104, which is representative of functionality to enable the computing device 102 to communicate wirelessly with other devices and/or entities. The client wireless module 104, for example, can be configured to enable data communication via a variety of different wireless techniques and protocols. Examples of such techniques and/or protocols include cellular communications (e.g. 2G, 3G, 4G, and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on. For instance, the client wireless module 104 is configured to employ techniques for determination of packet retransmission using a time threshold discussed herein.

The computing device 102 further includes client wireless hardware 106, which is representative of various hardware components that can be employed to enable the computing device 102 to communicate wirelessly. Examples of the client wireless hardware 106 include a radio transmitter, a radio receiver, various types and/or combinations of antennas, impedance matching functionality, and so on.

Further included as part of the computing device 102 are one or more device drivers 108, which are representative of functionality to enable the computing device 102 to interact with various devices, and vice-versa. For instance, the device drivers 108 can enable various functionalities of the computing device 102 (e.g., an operating system, applications, services, and so on) to interact with different devices, such as input/output (I/O) devices associated with the computing device 102. Further, the device drivers 108 can enable devices (e.g., I/O devices) associated with the computing device 102 to interact with various functionalities of the computing device 102.

The environment 100 further includes a remote device 110, which is representative of a variety of different devices that are configured to communicate wirelessly with the computing device 102. Examples of the remote device 110 include, by way of example and not limitation, a desktop computer, a portable computer (e.g., a laptop), a handheld computer such as a personal digital assistant (PDA), a tablet computer, and so forth. In at least some implementations, the remote device 110 may be implemented as an I/O device, such as a mouse, a keyboard, a game controller, a touchpad, an audio output device, a video display device, a sensor, a camera, and so on. These examples are presented for purpose of illustration only, and a wide variety of other device types and/or instances may be employed within the spirit and scope of the claimed embodiments.

The remote device 110 includes a device wireless module 112, which is representative of functionality to enable the remote device 110 to communicate wirelessly with other devices, such as the computing device 102. The device wireless module 112 can be configured to enable data communication via a variety of different wireless techniques and/or protocols, examples of which are referenced above and below.

Further included as part of the remote device 110 is device wireless hardware 114, which is representative of various hardware components that can be employed to enable the remote device 110 to communicate wirelessly. Examples of the client wireless hardware 114 include a radio transmitter, a radio receiver, various types and/or combinations of antennas, impedance matching functionality, and so on.

According to implementations discussed herein, techniques can be employed to establish wireless data communication between the remote device 110 and the computing device 102 utilizing a variety of different wireless data communication techniques and/or protocols. For instance, with reference to the 802.11 standards discussed above, techniques can be employed to enable direct wireless data communication between the remote device 110 and the computing device 102 via a WLAN connection between the devices, e.g., independent of a separate access point to manage a WLAN connection between the devices.

One example way of establishing and maintaining a WLAN connection between the remote device 110 and the computing device 102 utilizes portions of the Wi-Fi Direct™ protocol established and managed by IEEE. For instance, the computing device 102 and/or the remote device 110 can be configured to communicate via the Wi-Fi Direct™ protocol, such as via the exchange of Wi-Fi Direct™-compliant data packets. Thus, in at least some implementations, techniques for determination of packet retransmission using a time threshold discussed herein can be employed in the context of Wi-Fi Direct™ data communication between devices, such as between the computing device 102 and the remote device 110. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

For purpose of illustration, the environment 100 is discussed with reference to wireless data communication between a single remote device 110 and the computing device 102. However, embodiments discussed herein may be employed to generate and manage wireless connections between more than two devices. For instance, the computing device 102 can utilize techniques discussed herein to communicate wirelessly with multiple wireless devices concurrently, including the remote device 110. In at least some implementations, data communication between the computing device 102 and multiple wireless devices can be managed via virtual (e.g., logical) connections to the wireless devices. Further, the computing device 102 can employ various resource scheduling techniques and/or algorithms to manage virtual connections with multiple wireless devices. Examples of such resource scheduling techniques include round-robin scheduling, serial scheduling, priority-based scheduling, and so forth.

While the remote device 110 is discussed herein as being configured to communicate wirelessly, this is not intended to be limiting. For instance, in at least some embodiments the remote device 110 may be configured to communicate wirelessly with a particular device (e.g., the computing device 102), while be configured to communicate via a wired connection with a different device.

Although not expressly illustrated in FIG. 1, the environment 100 may include a network via which the computing device 102 and the remote device 110 may communicate. Examples of such a network include a local area network (LAN), a wide area network (WAN), the Internet, and so on. Thus, the computing device 102 and the remote device 110 may communicate with each other directly, and/or via one or more intermediary networks.

Having described an example environment in which the techniques described herein may operate, consider now a discussion of an example tracking table that can be used to track packet information in accordance with one or more embodiments.

Tracking Table

FIG. 2 illustrates an example tracking table 200 that can be employed to implement embodiments for determination of packet retransmission using a time threshold discussed herein. The tracking table 200, for instance, can represent data that is stored by the computing device 102, and that can be leveraged by the client wireless module 104 to perform various tasks. The tracking table 200 includes data fields that maintain various types of information associated with wireless packets that are received, e.g., by the computing device 102.

The tracking table 200 includes a sender identifier (ID) column 202, which includes identifiers for entities that send packets. The sender ID column 202 can includes various types of identifiers, such as device identifiers, user identifiers, and/or any other identifiers that may be utilized to identify an entity from which packets are sent. Examples of such identifiers include a media access control (MAC) address, an internet protocol (IP) address, an organizationally unique identifier (OUI), a user identifier (UID), and so forth.

The tracking table 200 further includes a packet type column 204, which includes entries that identify types for packets that are received. For instance, the packet types can identify various types of packets that are utilized in wireless data transmission. Example of such packet types include a request packet (e.g., as part of a request to associate via a wireless connection), a response packet (e.g., in response to an association request), a SYN packet, an ACK packet, and so on. These packet types are presented for purpose of example only, and the packet type column 204 can be employed to track a variety of different classifications and categories of packets. Further examples of suitable packet types can be found in the 802 Standards maintained by the IEEE.

Further included is a token column 206, which tracks tokens included as part of received packets. Generally, a token refers to an identifier that can be used to identify discrete packets, such as to differentiate one packet from another. As one example, the token column 206 can track dialog tokens included as part of received packets.

A timestamp column 208 is also included as part of the tracking table 200. The timestamp column 208 tracks receive times for packets, such as when a particular packet is first received by a device. The timestamp column 208 can track packet received times in various increments and/or combinations of increments, such as including minutes, seconds, hundredths of a second, milliseconds, and so on.

The tracking table 200 includes multiple packet entries that correspond to received packets. For instance, each of the rows of the tracking table 200 corresponds to information for a respective packet. According to embodiments discussed herein, packet entries in the tracking table 200 can be accessed to determine whether a received packet is a retransmission of a previously received packet.

For instance, consider a packet entry 210 and a packet entry 212. Comparison of these packet entries indicates different sender IDs in the sender ID column 202. Thus, the packet entry 212 can be determined to not be a retransmission of a packet associated with the packet entry 210.

As another example, consider a packet entry 214 as compared to the packet entry 210. Information from the packet entry 210, with the exception of the timestamp, matches that of the packet entry 214. Thus, a packet associated with the packet entry 214 can be considered a match to a packet associated with the packet entry 210.

In at least some implementations, a time differential between the timestamp for the packet entry 214 and the timestamp for the packet entry 210 is calculated. If the time differential is within a specified time threshold (e.g., less than the threshold), a packet associated with the packet entry 214 can be determined to be a retransmission of a packet associated with the packet entry 210. Thus, the packet associated with the packet entry 214 can be ignored, not processed, and/or processed in a different way than a normal (e.g., non-retransmission) packet.

The data fields and packet entries included as part of the tracking table 200 are presented for purpose of example only, and a wide variety of different types and/or combinations of packet data not expressly illustrated herein may be tracked in accordance with various embodiments.

Consider now a discussion of an example method in accordance with one or more embodiments.

Example Method

This section describes an example method in accordance with one or more embodiments. In the discussion, reference will be made to entities of the environment 100, as well as the tracking table 200 discussed above. This is not intended to be limiting, however, and the method may be implemented in a variety of different environments and contexts not expressly discussed herein.

Figure 3:
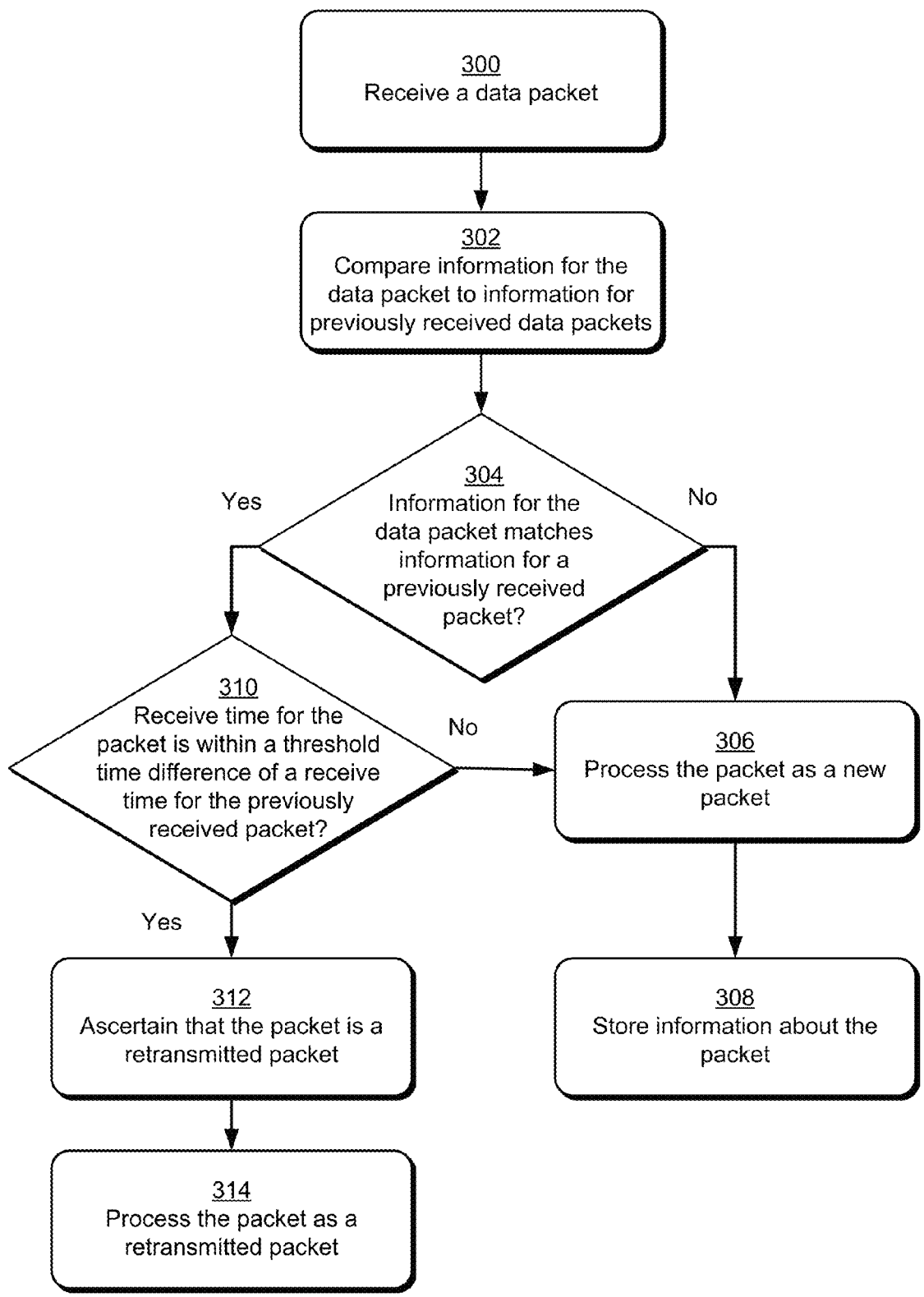
FIG. 3 is a flow diagram that describes steps in a method in accordance with one or more embodiments.

FIG. 3 is a flow diagram that describes steps in a method in accordance with one or more embodiments. Step 300 receives a data packet. The computing device 102, for example, can receive a data packet transmitted by the remote device 110.

Step 302 compares information for the data packet to information for previously received data packets. For instance, the information for the data packet can be compared to a table of packet information for received packets, such as the tracking table 200.

Step 304 ascertains whether the information for the data packet matches information for a previously received packet. If the information for the data packet does not match information for a previously received packet ("No"), step 306 processes the packet as a new packet. In at least some implementations, processing a packet as a "new" packet refers to processing the packet as if it has not been previously received and/or processed.

In at least some implementations, depending on the packet type, the packet can be processed as a new packet in different ways. If the packet is an association request packet, for example, the packet can be processed to generate an association response packet. The association response packet can be transmitted to initiate wireless data communication with another device. As referenced above, wireless data communication can be performed directly between devices, such as via an ad hoc wireless connection between devices. Additionally or alternatively, wireless data communication can occur via an intermediary, such as an intermediary network, a wireless hotspot, and so on.

As another example, the packet may be an association response packet, e.g., sent by another device in response to an association request. In such case, the packet can be processed to initiate wireless data communication with another device. These packet types and processing examples are presented for purpose of illustration only, and a wide variety of different packet types and processing implementations may be employed within the spirit and scope of the claimed embodiments. Further, although embodiments are discussed herein with reference to "data" packets, a variety of different packets may be utilized according to the claimed embodiments, such as management packets, internet protocol (IP) packets, network packets, and so forth.

Step 308 stores information about the packet. For instance, information about the packet can be stored as part of the tracking table 200.

Returning to step 304, if the information for the data packet matches information for a previously received packet ("Yes"), step 310 determines whether a receive time for the packet is within a threshold time difference of a receive time for the previously received packet. For instance, a threshold time difference can be pre-specified, such as 1 second, 3 seconds, 5 seconds, and so on. The receive time for the packet can be compared to a timestamp for the previously received packet, such as via the tacking table 200.

If the receive time for the packet is not within the threshold time difference ("No"), the method proceeds to step 306 where the packet is processed as a new packet. For instance, the receive time for the packet may meet or exceed the threshold time difference, and thus is not within the threshold time difference.

If the receive time for the packet is within the threshold time difference ("Yes"), step 312 ascertains that the packet is a retransmitted packet. For example, the difference between the receive time for the packet and the receive time for the previously received packet can be less than the threshold time difference.

Step 314 processes the packet as a retransmitted packet. For instance, the packet can be discarded and/or ignored. Alternatively, the packet can be processed in a different way than would a new packet.

Having described an example method, consider now a discussion of example implementations for retention of packet information in accordance with one or more embodiments.

Retention of Packet Data

According to various embodiments, the amount of packet information that is retained can be controlled, such as to avoid overburdening memory resources of a device. For instance, a size limit for the tracking table 200 can be specified, e.g., as a maximum number of senders tracked, a maximum memory size, and so on.

Figure 4:
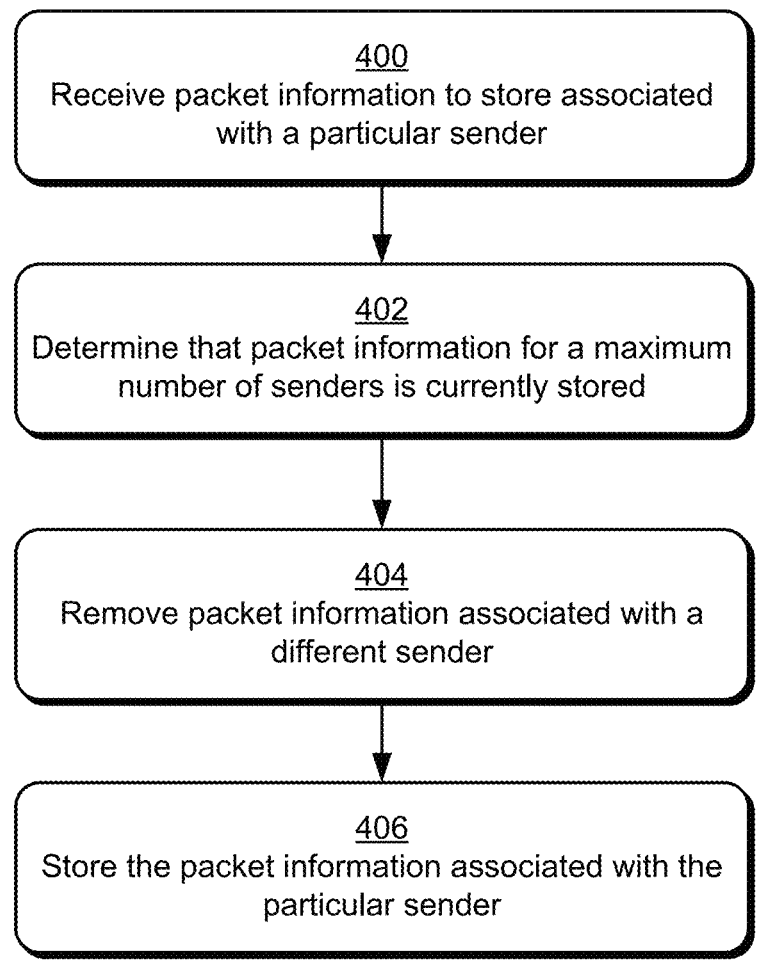
FIG. 4 is a flow diagram that describes steps in a method in accordance with one or more embodiments.

FIG. 4 is a flow diagram that describes steps in a method in accordance with one or more embodiments. In the discussion, reference will be made to entities of the environment 100, as well as the tracking table 200 discussed above. This is not intended to be limiting, however, and the method may be implemented in a variety of different environments and contexts not expressly discussed herein.

Step 400 receives packet information to store associated with a particular sender. For instance, the packet information can be received in response to a new packet being processed, such as discussed above with reference to FIG. 3. The packet information can be determined to be associated with a particular sender based on a sender ID included with the packet. Examples of a sender ID are discussed above.

Step 402 determines that packet information for a maximum number of senders is currently stored. For example, the tracking table 200 can include a sender limit that specifies a maximum number of senders that the tracking table 200 can store packet information for. The sender maximum can be based on different sender IDs listed in the tracking table 200. Depending on the particular implementation, any suitable maximum number of senders can be specified, such as 5, 10, 20, and so on.

Step 404 removes packet information associated with a different sender. For instance, entries in the tracking table 200 for the different sender can be removed (e.g., deleted) to make room for the packet information for the particular sender.

In at least some implementations, determining for which sender packet information is to be removed can be based on an age of the packet information. For instance, the most recent packet information timestamps for each sender in the tracking table 200 can be compared. The sender whose most recent packet information is oldest can be removed, such as from the tracking table 200. In at least some implementations, this can indicate a least active sender, such as a sender that is no longer sending data packets to a particular receiving device.

Step 406 stores the packet information associated with the particular sender. For example, a new entry in the tracking table 200 can be created for the particular sender, and packet information associated with the particular sender can be stored as part of the entry. Thus, in at least some implementations, packet information can be stored on a per-sender basis such that a number of senders (e.g., based on individual sender IDs) is tracked. Further, a maximum number of senders for which packet information is stored can be specified and enforced, as discussed above.

Having described example implementations for retention of packet information, consider now a discussion of example implementations for processing retransmitted packets in accordance with one or more embodiments.

Processing Retransmitted Packets

As referenced above, in at least some implementations, packets that are determined to be retransmitted packets can be ignored and/or deleted. Alternatively, retransmitted packets can be processed in a different way, e.g., differently than packets that are not retransmitted packets. For instance, a retransmitted packet can be processed to recover a wireless data connection between devices.

Figure 5:
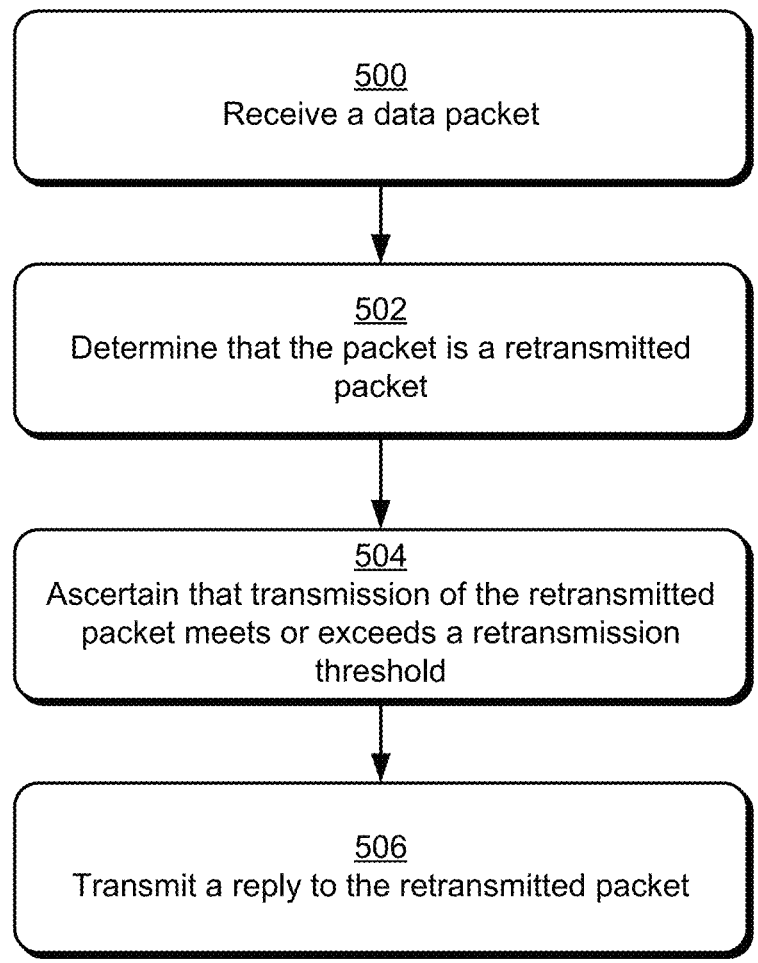
FIG. 5 is a flow diagram that describes steps in a method in accordance with one or more embodiments.

FIG. 5 is a flow diagram that describes steps in a method in accordance with one or more embodiments. In at least some embodiments, the method describes an example implementation of step 314, discussed above with reference to FIG. 3.

Step 500 receives a data packet. Step 502 determines that the packet is a retransmitted packet. Example ways of determining that a packet is a retransmitted packet are discussed above.

Step 504 ascertains that transmission of the retransmitted packet meets or exceeds a retransmission threshold. A retransmission threshold can be implemented in a variety of different ways. For instance, the retransmission threshold can be based on a number of times a particular retransmitted packet has been received. Additionally or alternatively, the retransmission threshold can specify a particular time period during which the retransmitted packet is received more than once.

Information related to a retransmission threshold can be tracked, e.g., via the tracking table 200. For instance, the tracking table 200 can track how many times a particular packet has been received, and/or a particular time interval during which the packet is retransmitted.

Step 506 transmits a reply to the retransmitted packet. The reply, for instance, can be transmitted in response to the retransmitted packet meeting or exceeding the retransmission threshold. In at least some implementations, the reply to the retransmitted packet can enable a wireless data connection to be established or reestablished (e.g., recovered) between devices. For instance, the reply can include an association response packet, a re-association response packet, a probe response packet, and so on.

Having described example implementations for processing retransmitted packets, consider now a discussion of an example system and device that can be employed in accordance with one or more embodiments.

Example System and Device

Figure 6:
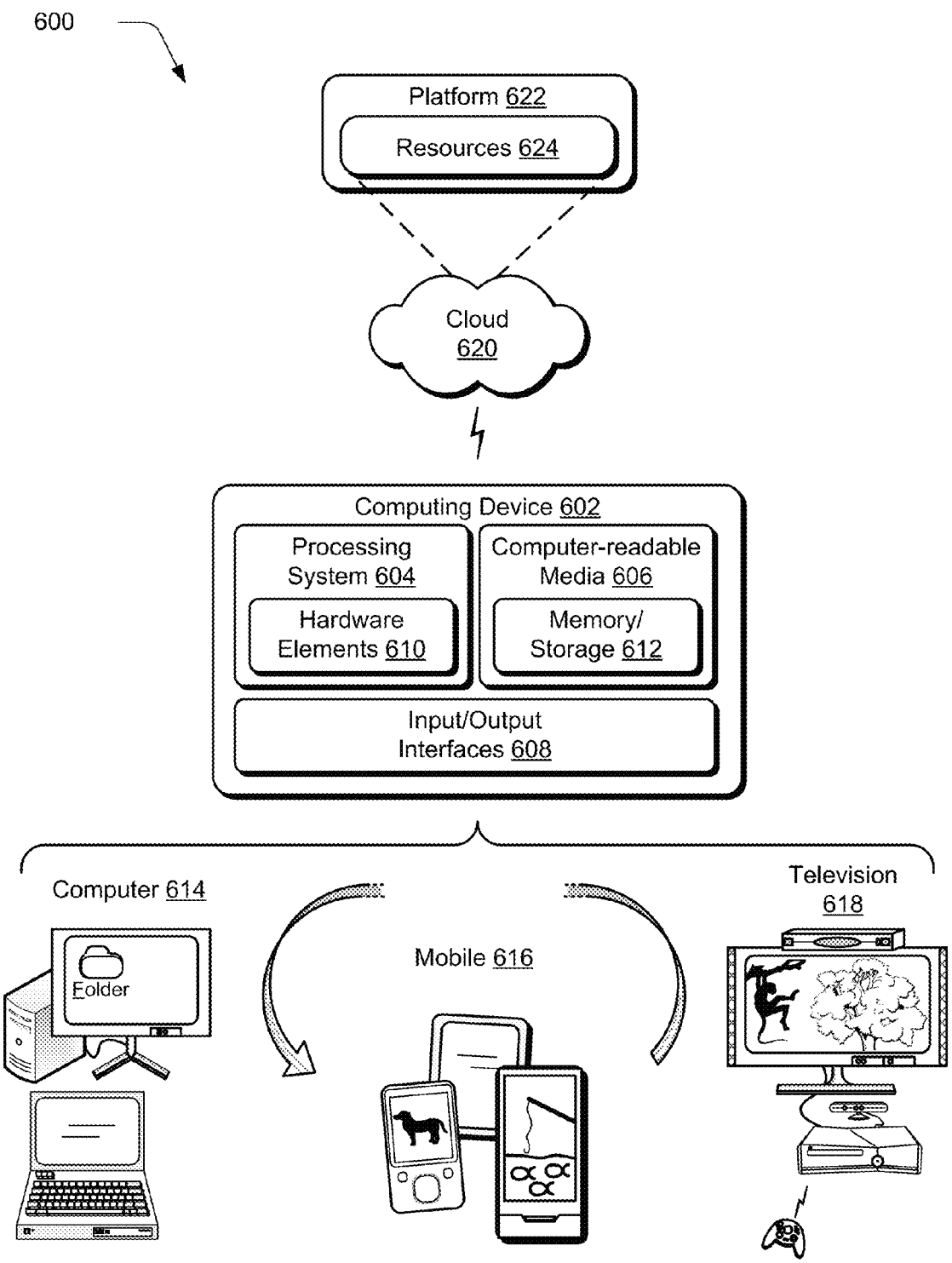
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, the computing device 102 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as an module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the client wireless module 104 and/or the device wireless module 112 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi™ network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for determination of packet retransmission using a time threshold are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   comparing information included in a data packet to information included in a previously received data packet;
   ascertaining whether the information included in the data packet matches the information included in the previously received data packet;
   responsive to ascertaining that the information included in the data packet matches the information included in the previously received data packet, ascertaining whether a receive time for the packet is within a threshold time difference of a receive time for the previously received packet; and
   determining whether to process the data packet as a new data packet or a retransmitted data packet based on whether the receive time for the data packet is within the threshold time difference of the receive time for the previously received data packet.

2. A computer-implemented method as described in claim 1, wherein the information included in the data packet includes at least one of a sender identifier, a packet type, or a token included with the data packet.

3. A computer-implemented method as described in claim 1, wherein said comparing comprises comparing the information included in the data packet to a table that includes information for multiple previously received data packets.

4. A computer-implemented method as described in claim 1, further comprising processing the data packet as a new data packet responsive to determining that the receive time for the data packet is not within the threshold time difference of the receive time for the previously received data packet.

5. A computer-implemented method as described in claim 1, further comprising processing the data packet as a new data packet responsive to determining that the receive time for the data packet is not within the threshold time difference of the receive time for the previously received data packet, wherein said processing the data packet as a new data packet comprises transmitting a response to the data packet that enables direct wireless data communication with a device.

6. A computer-implemented method as described in claim 1, further comprising processing the data packet as a retransmitted data packet responsive to determining that the receive time for the data packet is within the threshold time difference of the receive time for the previously received data packet.

7. A computer-implemented method as described in claim 6, wherein said processing the data packet as a retransmitted data packet comprises ignoring the data packet.

8. A computer-implemented method as described in claim 6, wherein said processing the data packet as a retransmitted data packet comprises:
   ascertaining that the data packet is retransmitted multiple times such that a number of retransmissions of the data packet meets or exceeds a retransmission threshold; and
   responsive to ascertaining that the number of retransmissions of the data packet meets or exceeds the retransmission threshold, transmitting a reply to the data packet.

9. A computer-implemented method as described in claim 1, wherein said comparing comprises comparing the information included in the data packet to a table that includes information for multiple previously received data packets, and wherein said method further comprises:
   processing the data packet as a new data packet responsive to determining that the receive time for the data packet is not within the threshold time difference of the receive time for the previously received data packet, the data packet being associated with a particular sender;
   determining that packet information for a maximum number of senders is currently stored in the table;
   removing packet information associated with a different sender from the table; and
   storing the packet data in the table as associated with the particular sender.

10. A computer-implemented method as described in claim 9, wherein the packet information for the different sender is removed responsive to determining that a most recent timestamp for one or more data packets associated with the different sender is older than one or more other most recent timestamps for at least one other data packet associated with at least one other sender.

11. One or more computer-readable storage media having instructions stored thereon that, responsive to execution by a computing device, cause the computing device to perform operations comprising:
   comparing information included in a data packet to information included in a previously received data packet, the information including a token for the data packet and a token for the previously received data packet;
   ascertaining whether the information included in the data packet matches the information included in the previously received data packet;
   responsive to ascertaining that the information for the data packet matches information for the previously received data packet, determining whether a receive time for the packet is within a threshold time difference of a receive time for the previously received packet; and
   performing one of:
      processing the data packet as a new data packet responsive to determining that the receive time for the data packet is not within the threshold time difference of the receive time for the previously received data packet; or
      process the data packet as a retransmitted data packet responsive to determining that the receive time for the data packet is within the threshold time difference of the receive time for the previously received data packet.

12. One or more computer-readable storage media as recited in claim 11, wherein the information included in the data packet further includes a sender identifier and a packet type for the data packet.

13. One or more computer-readable storage media as recited in claim 11, wherein the operations further comprise causing the computing device to process the data packet as a new data packet by transmitting a response to the data packet that enables direct wireless data communication with a device.

14. One or more computer-readable storage media as recited in claim 11, wherein the operations further comprise causing the computing device to process the data packet as a retransmitted data packet by ignoring the data packet.

15. One or more computer-readable storage media as recited in claim 11, wherein the operations further comprise:
   processing the data packet as a new data packet responsive to determining that the receive time for the data packet is not within the threshold time difference of the receive time for the previously received data packet;
   receiving packet information for the data packet to be stored as associated with a sender of the packet;
   determining that packet information for a maximum number of senders is currently stored;

removing packet information associated with a different sender based on the different sender being determined to be a least active sender; and storing the packet information for the data packet as being associated with the sender of the data packet.

16. One or more computer-readable storage media as recited in claim 11, wherein the operations further comprise processing the data packet as a retransmitted data packet by:

ascertaining that transmission of the retransmitted packet meets or exceeds a retransmission threshold; and transmitting a reply to the retransmitted packet.

17. An apparatus comprising:

at least one processor; and one or more computer-readable storage media storing computer-executable instructions that are executable by the at least one processor to cause the system to perform operations including:

ascertaining that information included in a data packet matches information included in a previously received data packet;

determining a receive time for the data packet and a receive time for the previously received data packet;

in an event that a receive time for the data packet is within a threshold time difference of a receive time for the previously received packet, processing the data packet as a retransmitted data packet; and in an event that the receive time for the data packet is not within the threshold time difference of the receive time for the previously received packet, processing the data packet as a new data packet.

18. An apparatus as described in claim 17, wherein the information includes one or more of a sender identifier included with the data packet, a packet type, or a token included with the data packet.

19. An apparatus as described in claim 17, wherein the apparatus comprises a computing device, and wherein processing the data packet as a new data packet comprises establishing wireless data communication with a different device.

20. An apparatus as described in claim 17, wherein the data packet is associated with a particular sender, and wherein processing the data packet as a new data packet comprises:

determining that packet information for a maximum number of senders is currently stored;

responsive to said determining, deleting packet information associated with a different sender; and storing packet information for the data packet as being associated with the particular sender.

* * * * *